(12) United States Patent
Fulleringer et al.

(10) Patent No.: US 12,420,943 B2
(45) Date of Patent: Sep. 23, 2025

(54) PROPULSIVE ASSEMBLY FOR A MULTI-ENGINE HYBRID AIRCRAFT

(71) Applicant: SAFRAN HELICOPTER ENGINES, Bordes (FR)

(72) Inventors: Benjamin Nicolas Fulleringer, Moissy-cramayel (FR); Antoine Pascal Moutaux, Moissy-Cramayel (FR); Romain Jean Gilbert Thiriet, Moissy-cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/843,089

(22) PCT Filed: Feb. 21, 2023

(86) PCT No.: PCT/FR2023/050247
§ 371 (c)(1),
(2) Date: Sep. 17, 2024

(87) PCT Pub. No.: WO2023/166256
PCT Pub. Date: Sep. 7, 2023

(65) Prior Publication Data
US 2025/0187739 A1    Jun. 12, 2025

(30) Foreign Application Priority Data

Mar. 3, 2022    (FR) ...................................... 2201843

(51) Int. Cl.
*B64D 35/08*    (2025.01)
*B64D 27/33*    (2024.01)
(Continued)

(52) U.S. Cl.
CPC ............. *B64D 35/08* (2013.01); *B64D 27/33* (2024.01); *B64D 35/023* (2024.01); *F01D 15/10* (2013.01);
(Continued)

(58) Field of Classification Search
CPC ...... B64D 27/33; B64D 35/023; B64D 35/08; F01D 15/10; F02C 3/103; F02C 3/145;
(Continued)

(56) References Cited

U.S. PATENT DOCUMENTS 8,657,566 B2 * 2/2014 Bedrine .................. F01D 15/10
                                              415/123
8,727,820 B2   5/2014 Stasolla et al.
(Continued)

FOREIGN PATENT DOCUMENTS

FR    3039614 A1      2/2017
FR    3066444 A1 *  11/2018 ................ F02C 7/36
(Continued)

OTHER PUBLICATIONS

International Search Report and Written Opinion issued for International Application No. PCT/US2023/050247, dated Mar. 30, 2023 (7 pages).
(Continued)

*Primary Examiner* — Jesse S Bogue
(74) *Attorney, Agent, or Firm* — Bookoff McAndrews, PLLC

(57) ABSTRACT

A propulsive assembly including a first and a second gas turbine each having a gas generator and a free power turbine, a main rotor coupled to the free power turbine of a first and a second main coupling, a first and a second reversible electric machine each coupled to the gas generator, by way of a first deactivatable coupling, and each coupled to the main rotor by way of a second deactivatable coupling, the (Continued)

first deactivatable coupling being activated when the electric machines are rotating in a first direction of rotation, and the second deactivatable coupling being activated when the electric machines are rotating in a second direction of rotation opposite to the first direction of rotation.

11 Claims, 10 Drawing Sheets

(51) Int. Cl.
    *B64D 35/023* (2024.01)
    *F01D 15/10* (2006.01)
    *F02C 3/10* (2006.01)
    *F02C 3/14* (2006.01)
    *F02C 7/36* (2006.01)

(52) U.S. Cl.
    CPC ............. *F02C 3/103* (2013.01); *F02C 3/145* (2013.01); *F02C 7/36* (2013.01); F05D 2220/323 (2013.01); F05D 2220/76 (2013.01)

(58) Field of Classification Search
    CPC .... F02C 6/206; F02C 7/26; F02C 7/36; F05D 2220/323; F05D 2220/76; Y02T 50/60
    See application file for complete search history.

(56) References Cited

U.S. PATENT DOCUMENTS

| | | | |
|---|---|---|---|
| 9,828,917 B2 * | 11/2017 | Klonowski | ............... F02C 6/14 |
| 10,604,266 B2 * | 3/2020 | Roever | .................. B64D 31/10 |
| 10,662,875 B2 * | 5/2020 | Lafargue | ................. F02C 6/206 |
| 11,732,639 B2 * | 8/2023 | LaTulipe | ............... B64D 27/33 |
| | | | 60/226.1 |
| 2011/0049891 A1 | 3/2011 | Bedrine et al. | |
| 2014/0283519 A1 * | 9/2014 | Mariotto | .............. B64D 35/023 |
| | | | 60/698 |
| 2025/0215824 A1 * | 7/2025 | Thiriet | ....................... F02C 3/10 |

FOREIGN PATENT DOCUMENTS

| | | | | |
|---|---|---|---|---|
| WO | WO-2015145036 A1 * | 10/2015 | .............. | F02C 6/206 |
| WO | WO-2024023445 A1 * | 2/2024 | .............. | F02C 3/113 |
| WO | WO-2024236253 A1 * | 11/2024 | .............. | B64C 27/12 |

OTHER PUBLICATIONS

French Search Report issued for priority Application No. 2201843, dated Sep. 26, 2022 (7 pages).

* cited by examiner

[Fig. 1]
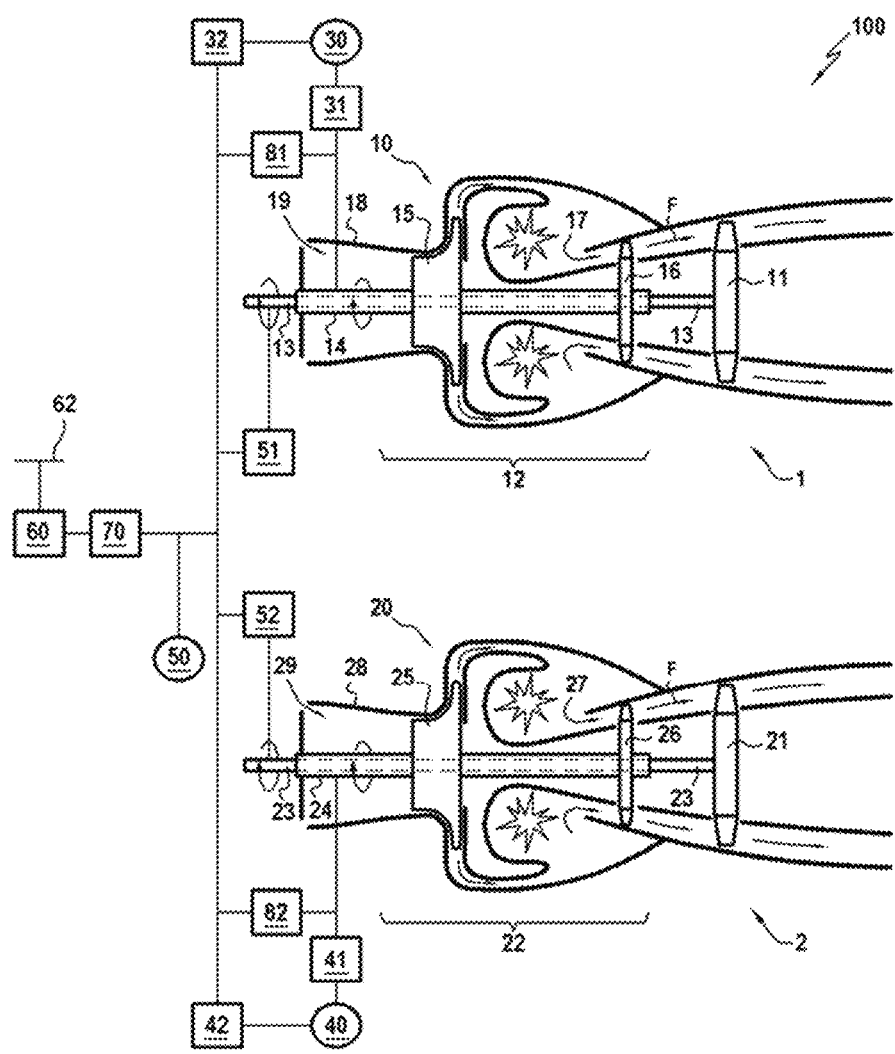

[Fig. 2]
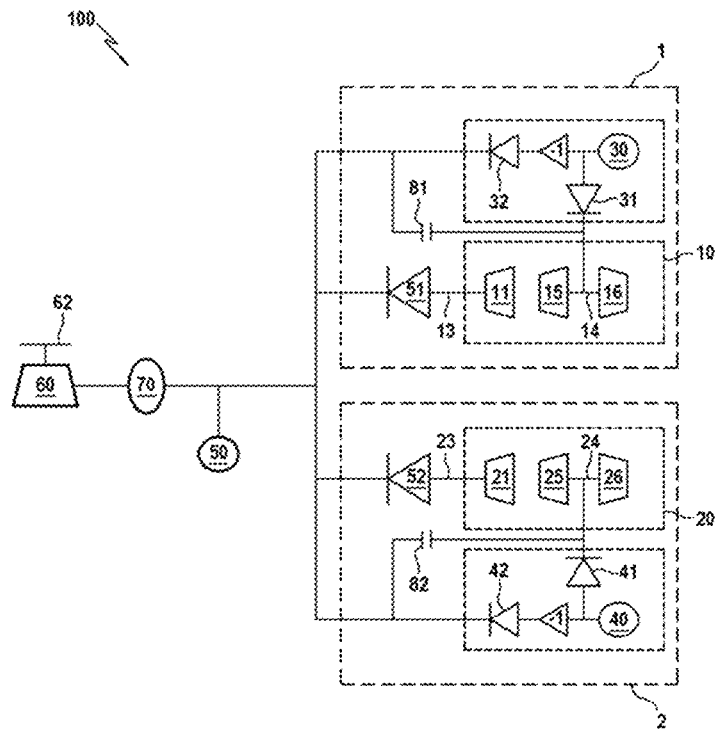
[Fig. 3]
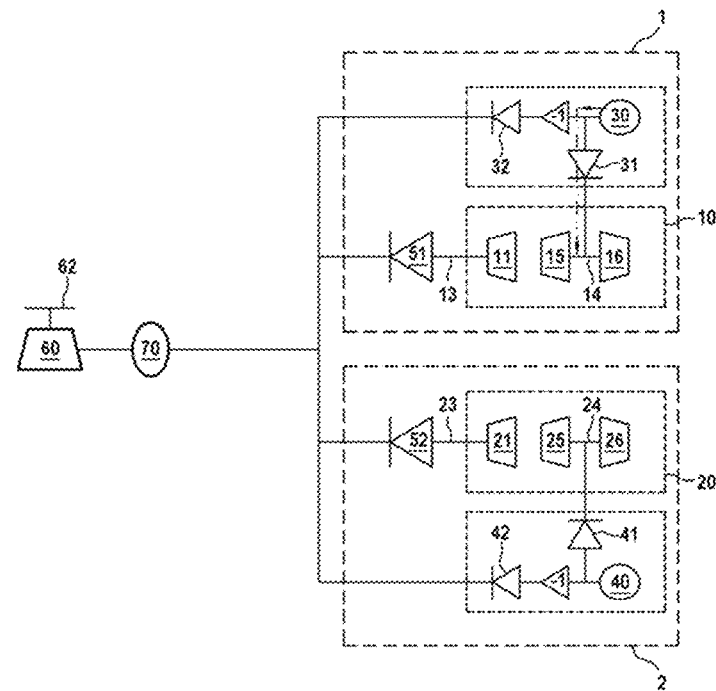

[Fig. 4]
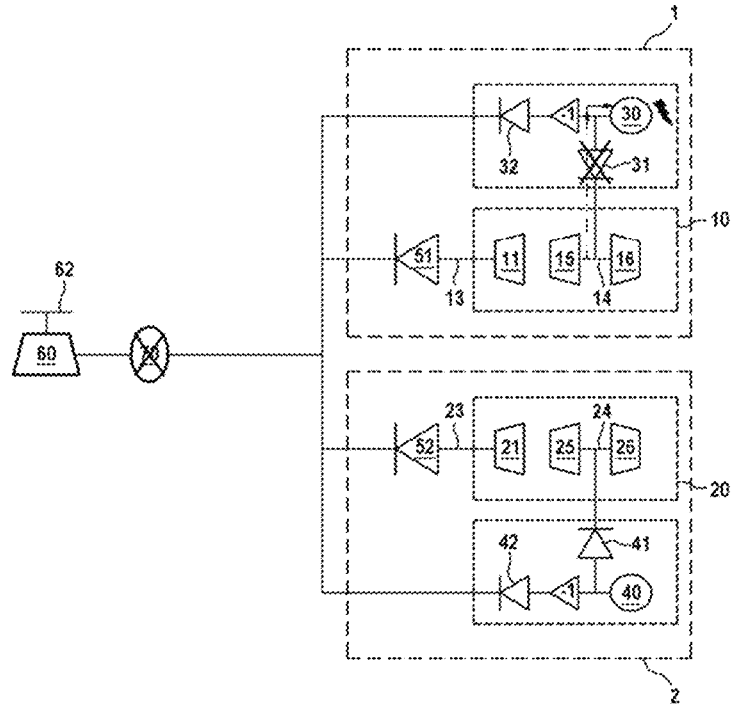
[Fig. 5]
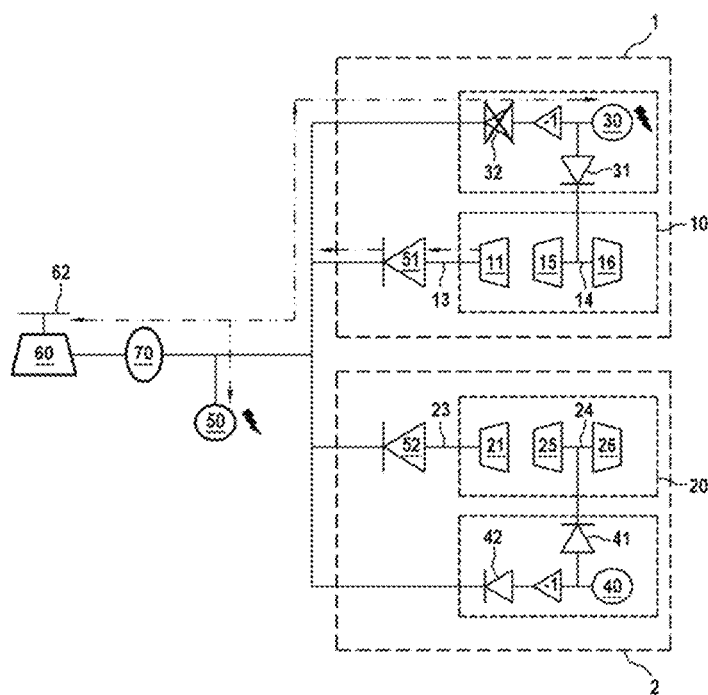

[Fig. 6]
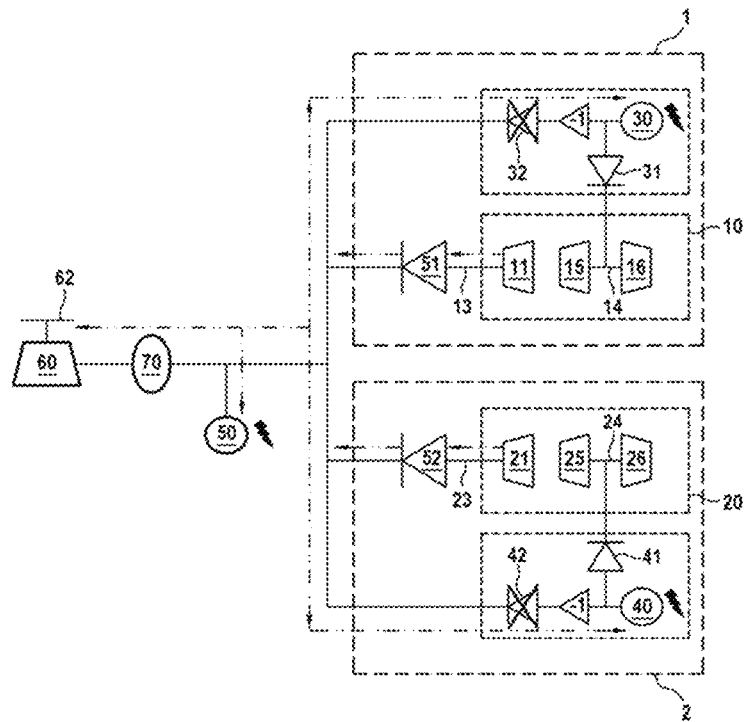
[Fig. 7]
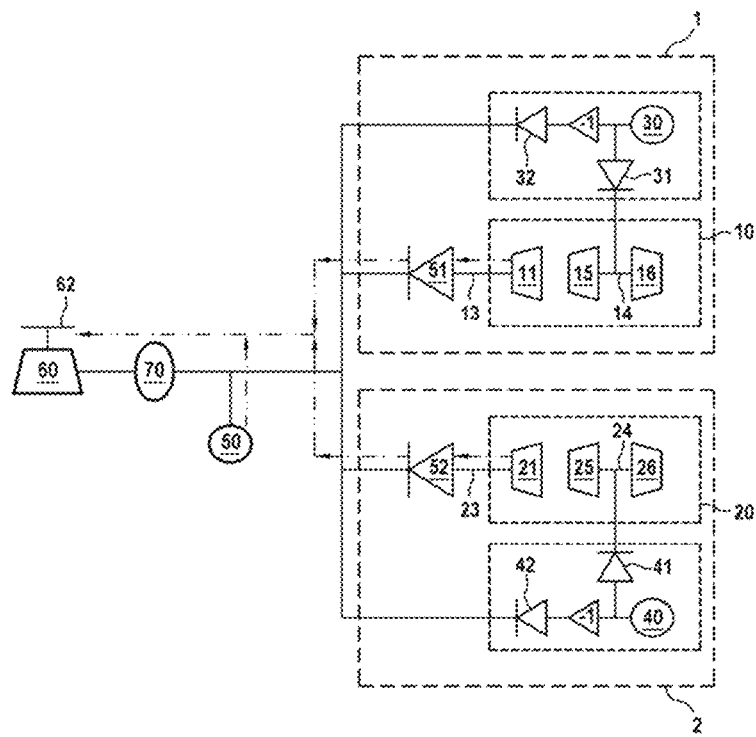

[Fig. 8]
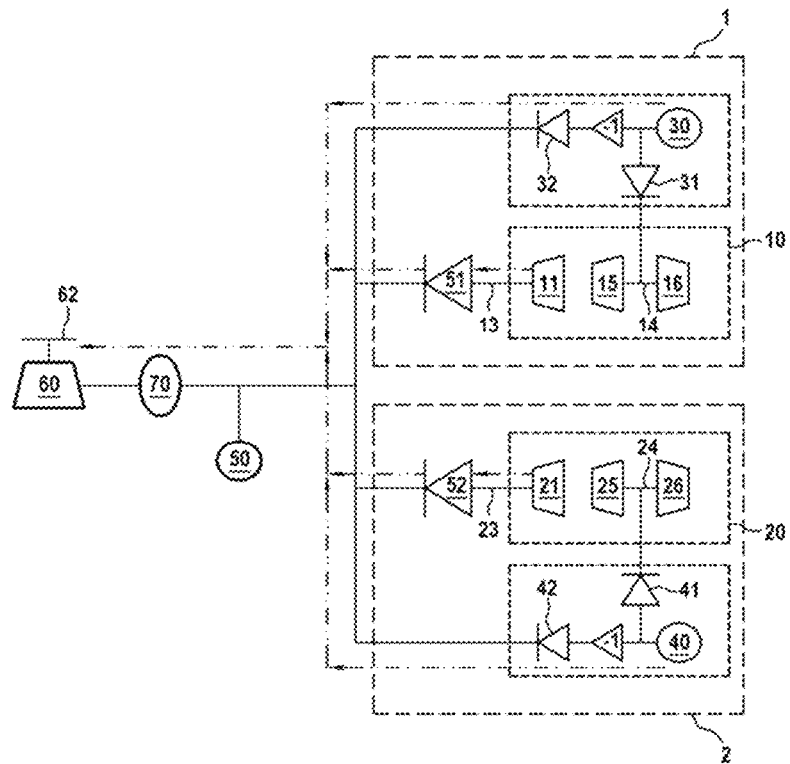
[Fig. 9]
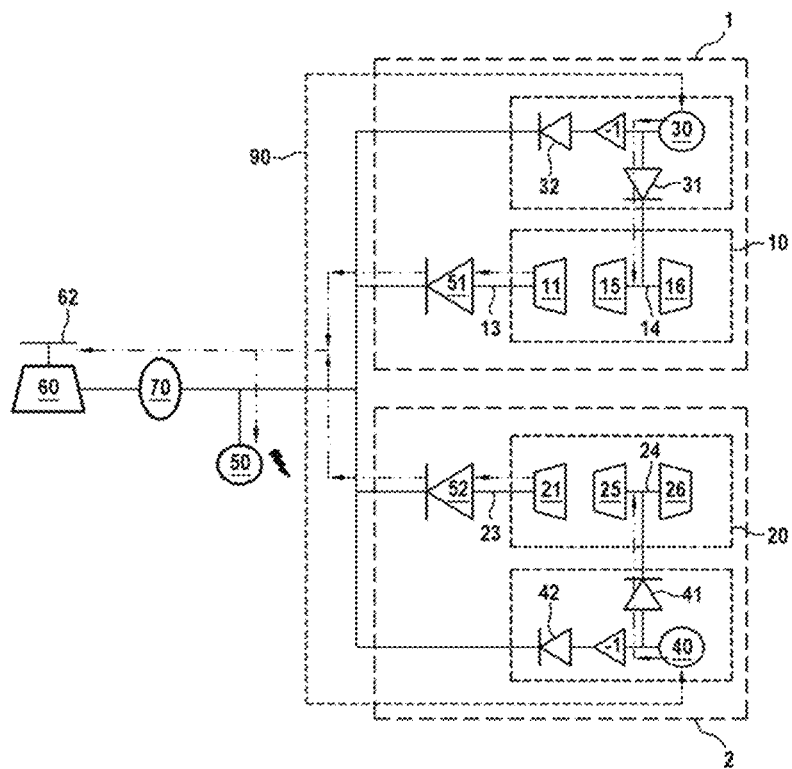

[Fig. 10]
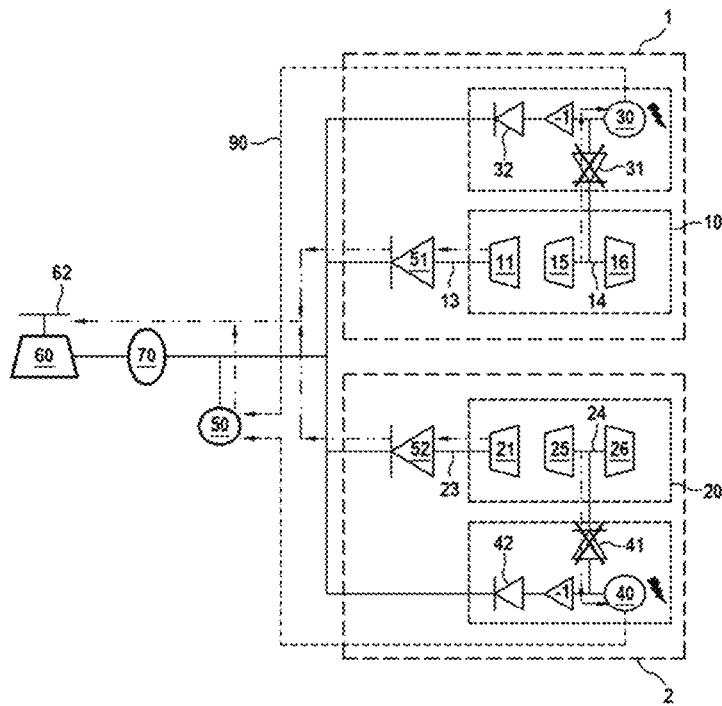
[Fig. 11]
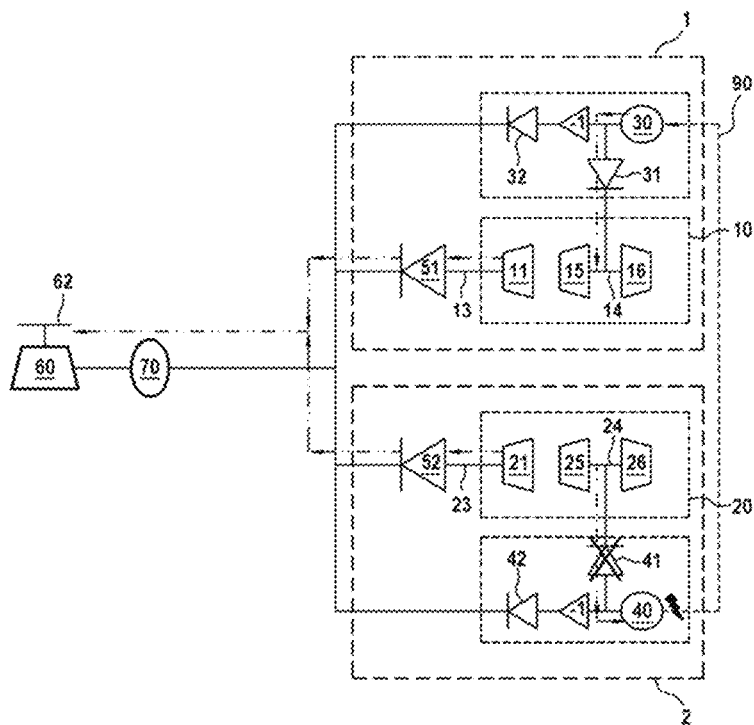

[Fig. 12]
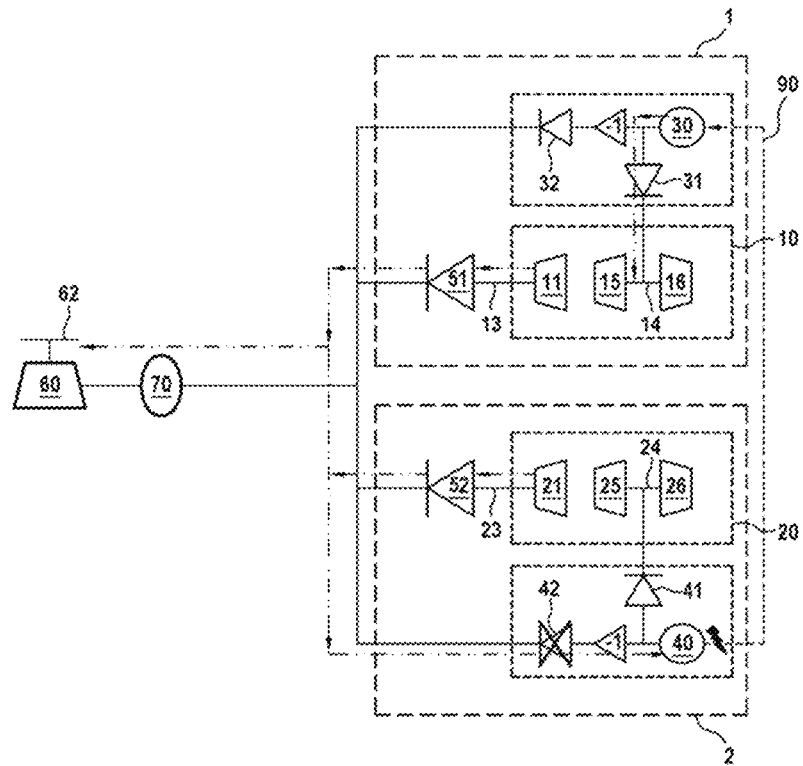
[Fig. 13]
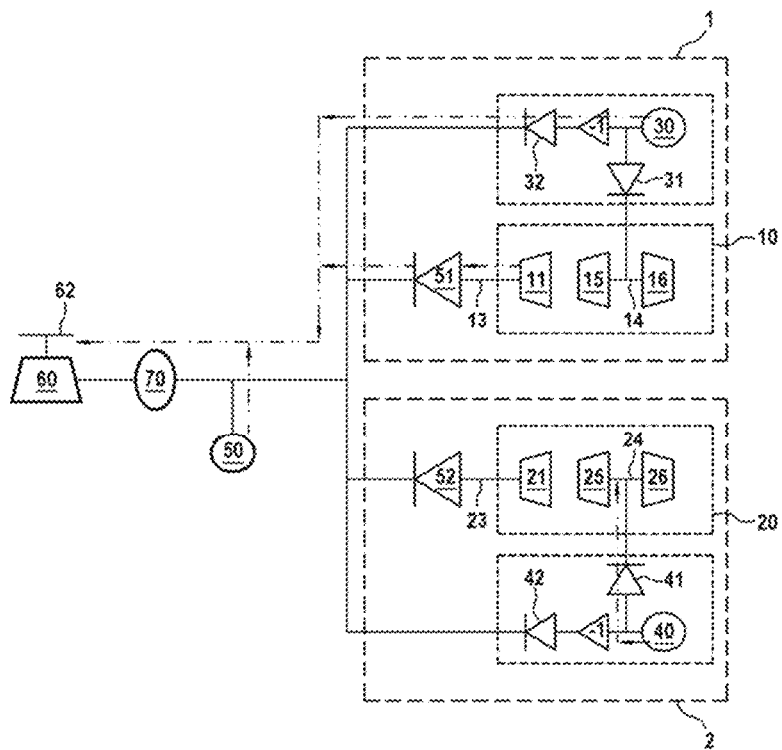

[Fig. 14]
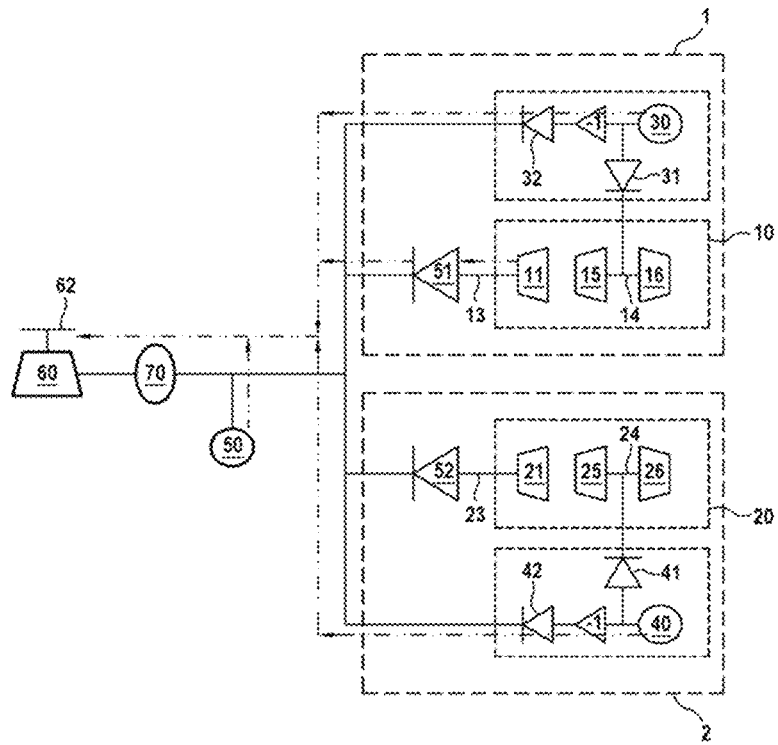
[Fig. 15]
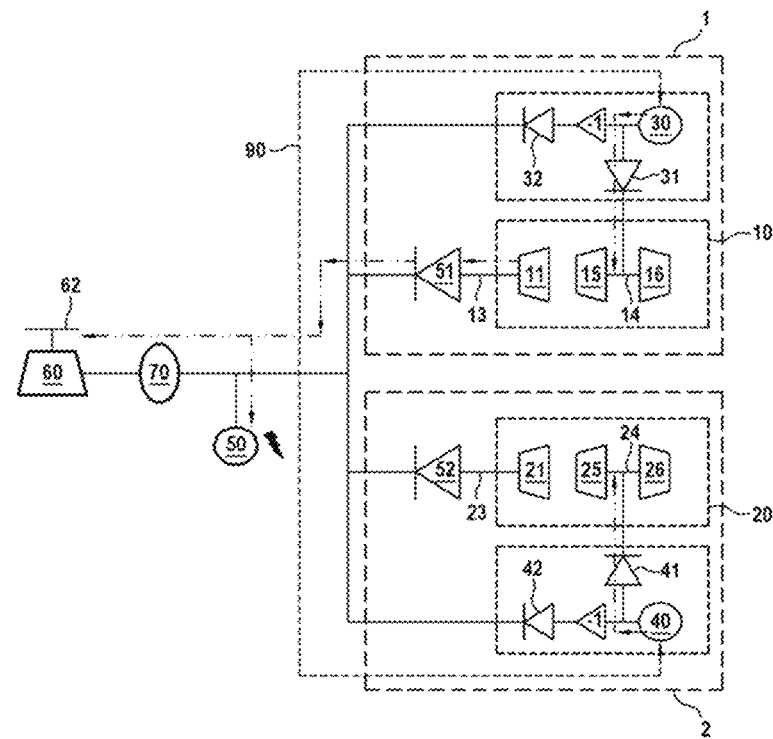

[Fig. 16]
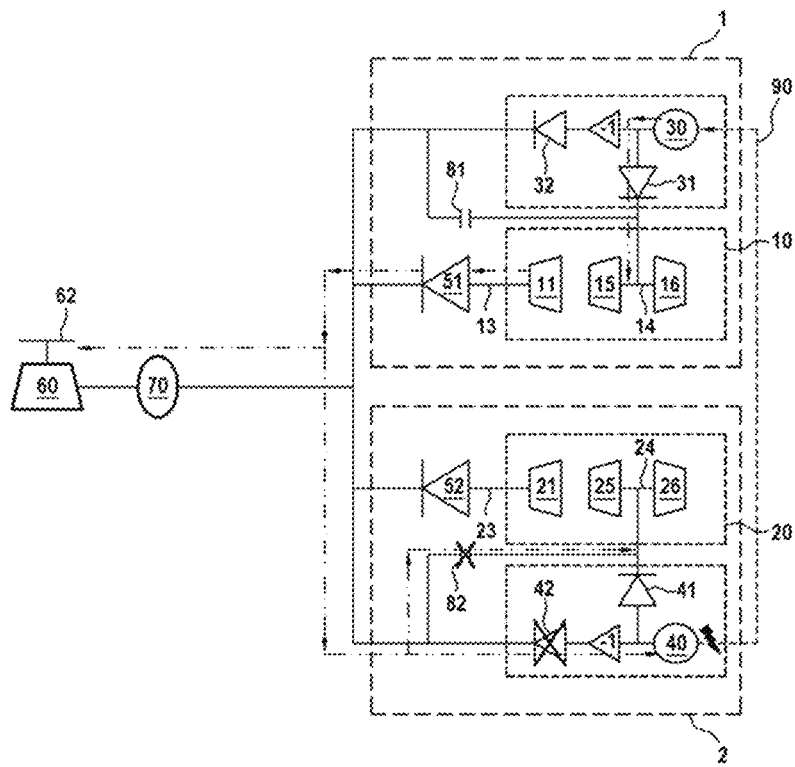
[Fig. 17]
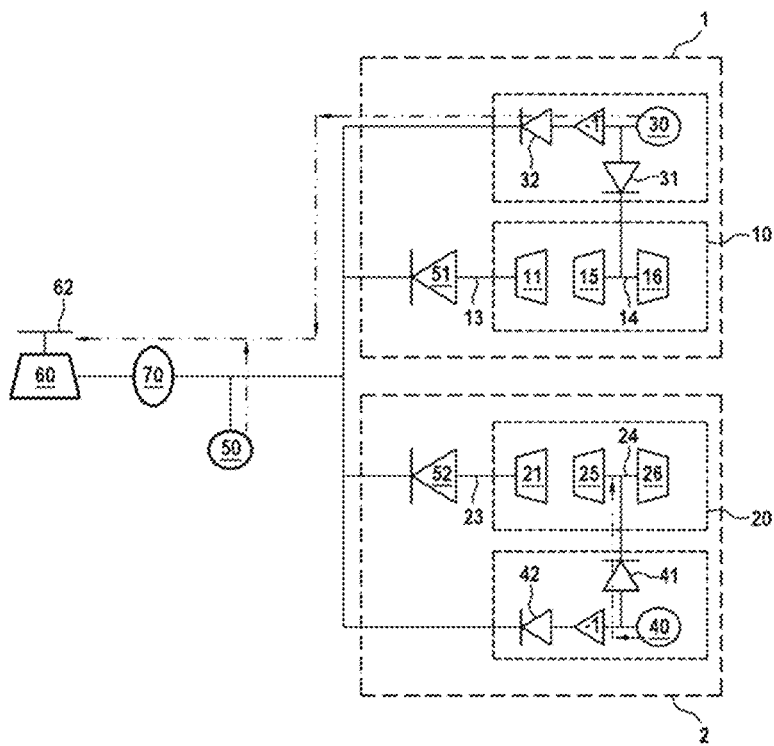

[Fig. 18]
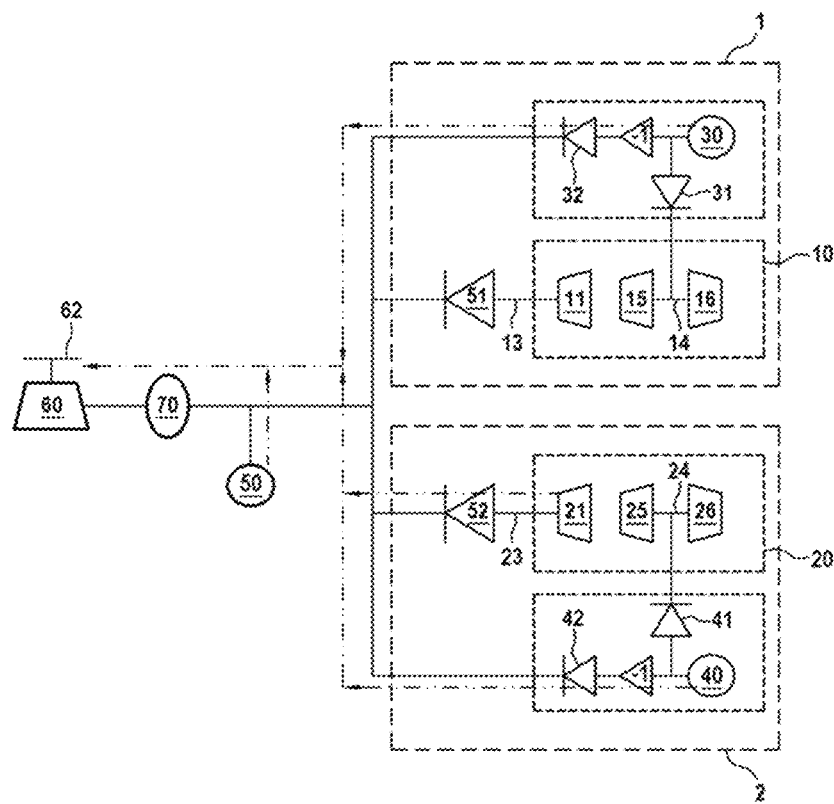

PROPULSIVE ASSEMBLY FOR A MULTI-ENGINE HYBRID AIRCRAFT

CROSS-REFERENCE TO RELATED APPLICATIONS

This is a National Stage Application under 35 U.S.C. § 371 of International Application No. PCT/FR2023/050247, filed Feb. 21, 2023, now published as WO 2023/166256 A1, which claims priority to French Patent Application No. 2201843, filed on Mar. 3, 2022.

TECHNICAL FIELD

This invention relates to the field of hybrid aircraft, comprising at least two engines such as turboshaft engines or turboprop engines, for flying machines such as helicopters or twin-engine airplanes. In particular, the invention relates to a propulsive assembly for a multi-engine hybrid aircraft, particularly a twin-engine hybrid aircraft, and a hybrid aircraft comprising such a propulsive assembly.

PRIOR ART

In a known manner, a turbomachine, for example a turboshaft engine, particularly for a helicopter, includes a gas turbine having a gas generator and a free power turbine rotationally driven by the stream of gas generated by the gas generator.

Conventionally, the gas generator includes at least a compressor and a turbine rotationally coupled. The operating principle is as follows: the cool air entering the gas turbine is compressed due to the rotation of the compressor before being sent to a combustion chamber where it is mixed with a fuel. The gas burned due to the combustion is then expelled at high speed. A first expansion then occurs in the turbine of the gas generator, during which this turbine extracts the energy needed to drive the compressor. The turbine of the gas generator does not absorb all the kinetic energy of the burned gas and the excess kinetic energy corresponds to the stream of gas generated by the gas generator. The latter therefore supplies the kinetic energy to the free power turbine so that a second expansion occurs in the free power turbine which converts this kinetic energy into mechanical energy in order to drive a receiving member, such as the rotor of the helicopter.

Certain aircraft include two or more turbomachines, each comprising a gas turbine as described above. Such is particularly the case for twin-engine or multi-engine helicopters. Such aircraft allow for operation in SEO (Single Engine Operative) mode. SEO mode is an operating mode of a twin-engine architecture in which one of the gas turbines is deliberately stopped, the other providing the entire power supply. This mode makes it possible to optimize the specific fuel consumption, which decreases with the power supplied by a turbomachine. Specifically, since the specific fuel consumption of a turbine decreases with the supplied power, it is preferable to supply 100% of the power with one turbine, rather than 50% by each of them.

One of the critical points of SEO mode is the ability to ignite the stopped turbine again in the event of loss of power of the turbine in operation. In order to ensure as quick a restart as possible, it is possible to keep the stopped turbine in standby (or "super idle" mode), i.e. to continue to run its gas generator exclusively by means of an electric machine, with no fuel provided. The generator is then kept in its "ignition window" (typically 10-30%) to allow the immediate ignition of the fuel, either in "super idle" mode by means of a combustion in super idle assisted by a contribution of electrical power via an electric machine, in order to benefit from a hot combustion chamber.

To fulfil these functions, existing solutions for example make provision for using the power supplied by the turbine in operation, drawn off the main rotor, to power the electric machine supplying the power to the turbine in standby mode, by means of a dedicated electric machine on each gas generator. This configuration thus requires four electric machines in all. More generally, twin-engine applications involve many functions, such as the starting of the gas generator, the generation of electricity on the ground, or the supply of electrical power to the main rotor.

The existing solutions for fulfilling these functions require a large number of electric machines, some of which are of much higher power than the generators/starters usually used, typically from several tens of kilowatts to a few hundred kilowatts, instead of tens of kilowatts, and are not entirely satisfactory.

There is thus a need for a propulsive assembly for a twin-engine or multi-engine aircraft having an architecture at least partially solving the aforementioned drawbacks.

SUMMARY OF THE INVENTION

This summary relates to a propulsive assembly for a hybrid aircraft, particularly a multi-engine helicopter, comprising:
  at least a first gas turbine and a second gas turbine each having a gas generator and a free power turbine rotationally driven by a stream of gas generated by the gas generator,
  a main rotor coupled to the free power turbine of the first gas turbine and of the second gas turbine by way of a first and a second main coupling means respectively,
  a first reversible electric machine and a second reversible electric machine each able to be coupled to the gas generator of the first gas turbine and of the second gas turbine respectively by way of a first deactivatable coupling means, and to be each coupled to the main rotor by way of a second deactivatable coupling means, the first deactivatable coupling means being each configured to be activated when the first and the second electric machine are rotating in a first direction of rotation, and the second deactivatable coupling means being configured to be activated when the first and the second electric machine are rotating in a second direction of rotation opposite to the first direction of rotation.

The term "deactivatable coupling means" should be understood to mean that the coupling means can be in an activated position in which the members connected to said coupling means are coupled, or in a deactivated position in which said members are decoupled, it being understood that the term "member" should be understood to mean the electric machines, the main rotor and the gas generator.

It will also be understood that each electric machine is associated with a first deactivatable coupling means and with a second deactivatable coupling means. In other words, the first reversible electric machine is coupled to the gas generator of the first gas turbine by way of a first deactivatable coupling means, and is coupled to the main rotor by way of a second deactivatable coupling means. In the same way, the second reversible electric machine is coupled to the gas generator of the second gas turbine by way of a first deactivatable coupling means, and is coupled to the main rotor by way of a second deactivatable coupling means.

The propulsive assembly according to this summary is particularly advantageous in that each gas turbine is associated with a single electric machine, the electric machines being alternatively able to fulfil specific functions and to fulfil supplementary functions, while together providing the necessary level of redundancy on the critical functions to increase flight safety.

More precisely, the first and the second electric machine can be used in one direction of rotation to be mechanically coupled to the gas generator of the first and of the second gas turbine, and in the other direction of rotation to be mechanically coupled to the main rotor. In particular, the first (and/or second) electric machine rotating in the first direction of rotation allows for coupling with the gas generator of the first (and/or of the second) gas turbine in order to start the latter on the ground, but also allows coupling with said gas generator in order to supplement the thermodynamic power in certain flight phases, for assistance in the transient phases or when modifying the engine operating point for example.

Furthermore, the first (and/or second) electric machine rotating in the first direction of rotation can be used to restart the gas generator of the first (and/or of the second) gas turbine in flight, for example following a fault therein, without requiring the activation of another mechanical member such as a clutch. In addition, even when the first (or second) electric machine is used in the first direction of rotation to restart the gas generator in flight, the second (or first) electric machine can be used alongside it to assist the second gas turbine by supplementing the power to the main rotor.

Moreover, the first and/or second electric machine rotating in the second direction of rotation can be used to drive the main rotor as a replacement for the first and/or second gas turbine in the event of a fault therein, or to supplement it in certain flight phases requiring an additional power contribution.

In addition, during operation in SEO mode, when the first (or second) gas turbine is the only one driving the main rotor, the second (or first) electric machine can be used to keep the gas generator of the second (or of the first) gas turbine in standby mode, or to input electrical energy to the first (or the second) electric machine when the standby mode is provided by a coupling means such as a clutch or a dog described hereinafter.

At the same time, the first (or the second) electric machine can be used to provide additional power to the gas generator of the first (or of the second) gas turbine. In other words, this architecture makes it possible, in SEO mode, to maintain one of the gas generators in standby mode permitting a quick restart, while allowing internal hybridization, i.e. an exchange of power between the electric machines and the gas generators to limit the ageing of the gas turbine that is kept ignited.

Consequently, the multi-engine architecture according to this summary has the advantage of being simple by limiting the number of components and connections. It is thus possible to rationalize and limit the number of electric machines, while allowing the fulfilment of a large number of functions by pooling them, and by reducing the mass of the device.

In certain embodiments, the first electric machine and the second electric machine are configured to operate in motor mode in which they are able to input power to the main rotor or to the gas generator of the first and of the second gas turbine respectively, according to their direction of rotation, or in generator mode in which they are able to be rotationally driven by the main rotor or by said gas generator by locking one or the other of the first or the second deactivatable coupling means, in such a way as to generate electrical energy.

The deactivatable coupling means associated with each electric machine can be lockable. They may for example comprise locking means movable between a free position in which the gas generator (for example) cannot rotationally drive the electric machine, and a locked position in which the gas generator is able to rotationally drive the electric machine, in such a way that the electric machine draws electrical power off the gas generator.

The locking of the deactivatable coupling means makes it possible to force the coupling between the electric machines and the gas generator (or the main rotor). For example, when the coupling means comprises a free wheel and a locking means, the free wheel is referred to as the "lockable free wheel", so that in the locked position, the hub of the free wheel can rotationally drive the peripheral ring gear of the lockable free wheel. In other words, the gas generator (or the main rotor) is able to rotationally drive the first or the second electric machine.

In other words, the electric machines may be used to draw power off the gas generator or the main rotor and thus supply electrical power to the onboard electrical system in APU (Auxiliary Power Unit) mode on the ground for the recharging of the batteries for example, or in flight as a supplement or replacement for one of the electric machines, for example in the event of a malfunction of the latter, via an electrical connection between the first electric machine and the second electric machine.

In certain embodiments, the propulsive assembly comprises a first coupling means coupled to the main rotor and to the gas generator of the first gas turbine, and a second coupling means coupled to the main rotor and to the gas generator of the second gas turbine, the first and the second coupling means being movable between a decoupling position, and a coupling position in which the main rotor is coupled with the gas generator of the first and of the second gas turbine respectively.

The first and the second coupling means may be mechanical systems such as clutches, dogs or dogs with angles of taper allowing for automatic declutching in the event of a quick start. In the decoupling position, the main rotor cannot drive the gas generator. In the coupling position, the main rotor and the gas generator of the first (or of the second) gas turbine are mechanically connected, so that said gas generator can be driven, even at low speed, by the main rotor.

The first coupling system, for example, thus constitutes a bypass branch making it possible to circumvent the first electric machine and the deactivatable coupling means which are associated therewith, so that the standby mode of the first gas turbine can be provided while freeing up the first electric machine. The latter can then be used for other functions such as internal hybridization (contribution of electrical energy to the second electric machine for example), in generator mode by locking the second deactivatable coupling means.

The presence of the coupling means makes it possible to dispense with the use of a third electric machine, which would be necessary to provide the internal hybridization while, in particular, contributing electrical energy to the first and to the second electric machine in the absence of any coupling means. Thus, only two electric machines are needed in SEO mode to fulfil the desired functions, which makes it possible to simplify the architecture and to limit the mass of the propulsive assembly.

In certain embodiments, when one of the first or the second gas turbine is the only one driving the main rotor, the gas generator of the other of the first or the second gas turbine is kept in a standby mode, at a power of less than 5 kW, by way of the first or the second coupling means in the coupling position.

When the aircraft is operating in SEO mode, the first gas turbine, for example, provides the entire supply of power, while the second gas turbine is deliberately stopped, or preferably put in standby mode, in order to optimize the specific fuel consumption. The standby mode makes it possible to keep the gas generator of the second gas turbine at lower power, of less than 5 kW, or in a range of 5 to 30% of its nominal rotation speed, in order to allow for quick re-ignition in the event of necessity, particularly when the first gas turbine stops deliberately. This keeping in standby mode by the second coupling means, in the coupling position, also makes it possible to free up the second electric machine for other functions such as internal hybridization. This configuration is particularly advantageous insofar as the electric machines, dimensioned to quickly ignite the gas turbines, in particular by supplying several tens of kilowatts or to assist the rotor by supplying a few hundred kilowatts, are not monopolized for the keeping in standby mode, requiring less than 5 kW.

In certain embodiments, when the first gas turbine is the only one driving the main rotor, the first electric machine operates in motor mode in such a way as to input power to the gas generator of the first gas turbine, and the second electric machine operates in generator mode in such a way as to input electrical energy to the first electric machine.

It will be understood that the first electric machine operates in motor mode by rotating in the first direction of rotation, in such a way as to input power to the gas generator of the first gas turbine by way of the first deactivatable coupling means. Similarly, the second electric machine operates in generator mode by being driven by the main rotor, the second deactivatable coupling means then being locked, in such a way as to input electrical energy to the first electric machine and thus limit the ageing thereof. Note to do so the first electric machine can be electrically connected to the second electric machine by way of an electrical connection.

In certain embodiments, when the second gas turbine is the only one driving the main rotor, the second electric machine operates in motor mode in such a way as to input power to the gas generator of the second gas turbine, and the first electric machine operates in generator mode in such a way as to input electrical energy to the second electric machine. Owing to this architecture, it is thus possible, by way of only two electric machines, to limit the ageing of the single gas turbine in operation, while providing internal hybridization, by way of one of the electric machines supplying electrical power to the other electric machine.

In certain embodiments, the propulsive assembly is configured so that, when the first gas turbine that is the only one driving the main rotor stops, the second electric machine operates in motor mode in such a way as to input a power greater than or equal to 50 kW to the gas generator of the second gas turbine.

In certain embodiments, the propulsive assembly is configured so that, when the second gas turbine that is the only one driving the main rotor stops, the first electric machine operates in motor mode in such a way as to input a power greater than or equal to 50 kW to the gas generator of the first gas turbine.

When the aircraft is operating in SEO mode, and one or the other of the gas turbines driving the main rotor on its own stops in an untimely manner, the other of the gas turbines kept in standby mode can thus be quickly restarted by the injection of a high power, greater than or equal to 50 kW, into the gas generator of the latter.

In certain embodiments, the propulsive assembly comprises a third reversible electric machine able to be coupled to the main rotor and to the free power turbine of the first gas turbine and of the second gas turbine by way of the first main coupling means and the second main coupling means respectively.

In certain embodiments, the third electric machine is configured to operate in generator mode, in which it is able to be rotationally driven by the main rotor, itself driven by the free power turbine of the first and/or of the second gas turbine by way of the first and/or the second main coupling means, in such a way as to generate electrical energy, or in motor mode in which it is able to input power to the main rotor.

Although redundant with the first and the second electric machine in most operating modes, the use of a third electric machine makes it possible to produce symmetrical internal hybridization when both gas turbines are ignited, which is not possible when only the first and second electric machines are present. It also makes it possible to dispense with the use of second lockable deactivatable coupling means, and thus to simplify the structure of the assembly (only the first deactivatable coupling means would then be lockable), allowing electrical generation from the main rotor.

In certain embodiments, when the first gas turbine is the only one driving the main rotor, the gas generator of the second gas turbine is kept in standby mode, at a power of less than 5 kW, by way of the second electric machine which operates in motor mode. Preferably, the first electric machine operates in motor mode in such a way as to input the power to the gas generator of the first gas turbine, and the third electric machine operates in generator mode in such a way as to input electrical energy to the first and to the second electric machine.

The use of a third electric machine makes it possible to dispense with the use of the first and the second coupling means, thus limiting the number of transmission members. Specifically, in SEO mode, the third electric machine can be used in generator mode to power the second electric machine which keeps the second gas turbine in standby mode, and to power the first electric machine in order to produce the internal hybridization and limit the ageing of the first gas turbine. The third electric machine can also be used in motor mode to supplement the power supplied by the first gas turbine, in certain operating phases. Note that the propulsive assembly can also comprise the third electric machine in combination with the aforementioned coupling means, in order to increase the level of redundancy.

In certain embodiments, when the second gas turbine is the only one driving the main rotor, the gas generator of the first gas turbine is kept in a standby mode, at a power of less than 5 kW, by way of the first electric machine which operates in motor mode. Preferably, the second electric machine operates in motor mode in such a way as to input power to the gas generator of the second gas turbine, and the third electric machine operates in generator mode in such a way as to input electrical energy to the first and to the second electric machine.

In certain embodiments, the propulsive assembly comprises a rotor brake able to be disposed between the free power turbine of the first and of the second gas turbine, and the main rotor, while being movable between a braking position preventing the driving of the main rotor by the free power turbine of the first and/or of the second gas turbine or external forces, and a free position allowing the driving of the main rotor by said free power turbine.

More precisely, the free power turbine of the first and of the second gas turbine is coupled to the main rotor, while a movable rotor brake disposed on the drivetrain allows for its locking. At start-up, the hot gas drives the free power turbine. The latter, connected to the main rotor by way of the first or the second main coupling means, can be either free when the rotor brake is in the free position, or locked by the rotor brake when the latter is in the braking position. This braking position therefore makes it possible to lock the main rotor and by collateral effect the free power turbine, particularly when starting in high wind.

In certain embodiments, the first and the second main coupling means, and the first and the second deactivatable coupling means associated with each of the first and the second electric machine, comprise a free wheel.

One purpose of the free wheel is that it does not need to be electronically or mechanically controlled by an outside operator. The free wheel also has high reliability. Such a free wheel is generally composed of a hub and a peripheral ring gear mounted rotatably on the hub. The hub can generally rotationally drive the peripheral ring gear when the torque is applied in the intended direction. The peripheral ring gear can rotationally drive the hub when the torque is applied in the other direction without compromising the principle of this invention. Thus, the hub can only drive the ring gear when the hub is rotating in a predetermined direction with respect to the ring gear, which will be referred to as the "direction of engagement". In the contrary case, the hub and the peripheral ring gear rotate freely with respect to one another.

In this case, the deactivatable coupling means are activated when the hub of the free wheel rotationally drives the peripheral ring gear, and conversely, the deactivatable coupling means are deactivated when the hub of the free wheel does not rotationally drive the peripheral ring gear. The fact of using free wheels as coupling elements between the different members, in the absence of any other coupling means such as clutches or dogs, makes it possible to improve the reliability of the propulsive assembly.

In certain embodiments, the propulsive assembly comprises a control unit configured to control the first electric machine, the second electric machine, the third electric machine, the deactivatable coupling means, and the rotor brake.

This summary also relates to a hybrid aircraft comprising a propulsive assembly according to any of the preceding embodiments, the hybrid aircraft being a multi-engine helicopter, particularly a twin-engine helicopter.

The term "hybrid aircraft" should be understood to mean an aircraft comprising a thermal engine making it possible to rotationally drive a main rotor, and at least one electric machine making it possible to input power to the thermal engine.

BRIEF DESCRIPTION OF THE DRAWINGS

The invention and its advantages will be better understood on reading the detailed description given hereinafter of different embodiments of the invention given by way of non-limiting example. This description references the appended pages of figures, on which:

FIG. 1 shows a section view of a propulsive assembly for a twin-engine aircraft according to the invention, FIG. 2 schematically represents the propulsive assembly of FIG. 1, FIG. 3 shows the propulsive assembly of FIG. 2, according to a first operating mode, FIG. 4 shows the propulsive assembly of FIG. 2, according to a second operating mode, FIG. 5 shows the propulsive assembly of FIG. 2, according to a third operating mode, FIG. 6 shows the propulsive assembly of FIG. 2, according to a fourth operating mode, FIG. 7 shows the propulsive assembly of FIG. 2, according to a fifth operating mode, FIG. 8 shows the propulsive assembly of FIG. 2, according to a sixth operating mode, FIG. 9 shows the propulsive assembly of FIG. 2, according to a seventh operating mode, FIG. 10 shows the propulsive assembly of FIG. 2, according to an eighth operating mode, FIG. 11 shows the propulsive assembly of FIG. 2, according to a ninth operating mode, FIG. 12 shows the propulsive assembly of FIG. 2, according to a tenth operating mode, FIG. 13 shows the propulsive assembly of FIG. 2, according to an eleventh operating mode, FIG. 14 shows the propulsive assembly of FIG. 2, according to a twelfth operating mode, FIG. 15 shows the propulsive assembly of FIG. 2, according to a thirteenth operating mode, FIG. 16 shows the propulsive assembly of FIG. 2, according to a fourteenth operating mode, FIG. 17 shows the propulsive assembly of FIG. 2, according to a fifteenth operating mode, FIG. 18 shows the propulsive assembly of FIG. 2, according to a sixteenth operating mode.

DESCRIPTION OF THE EMBODIMENTS

An architecture of a propulsive assembly 100 according to an embodiment of the invention will be described in the remainder of the description, with reference to FIGS. 1 to 18.

FIG. 1 schematically represents a propulsive assembly 100 of a twin-engine aircraft, comprising a first turbomachine 1 and a second turbomachine 2, rotationally driving transmission members 60 of a helicopter bearing a propeller or a main rotor 62. The turbomachines may be turboshaft engines or turboprop engines. Although the propulsive assembly described in the remainder of the description comprises two turbomachines, this example is non-limiting, the invention being equally applicable to propulsive assemblies of multi-engine aircraft comprising more than two engines.

The first turbomachine 1 and the second turbomachine 2 are preferably identical and have the same features. Thus, the description below references both the first and the second turbomachine 1, 2.

The first turbomachine 1 and the second turbomachine 2 respectively comprise a gas turbine 10, 20 having a gas generator 12, 22 and a free power turbine 11, 21 able to be rotationally driven by a stream of gas generated by the gas generator 12, 22. The free power turbine 11, 21 is mounted on a shaft 13, 23 which transmits the rotational movement to a receiving member such as a main rotor 62 of the helicopter by way of the transmission members 60. According to this example, the gas turbine 10, 20 shown on FIG. 1 is of the type with front power take-off with a coaxial shaft gear. It is quite possible to consider, without departing from the scope of the invention, a gas turbine with a free power turbine of the type with a front power take-off with an inner or outer shaft gear, or else a turbomachine with a free power turbine of rear power connector type. In the same way, the turbine may be in direct engagement or incorporate a reduction gear without compromising the principle of the invention.

The gas generator 12, 22 includes a rotary shaft 14, 24 on which are mounted a compressor 15, 25 and a turbine 16, 26, as well as a combustion chamber 17, 27 axially disposed between the compressor 15, 25 and the turbine 16, 26 when the gas generator 12, 22 is considered along the axial direction of the rotary shaft 14, 24. The gas turbine 10, 20 has a casing 18, 28 provided with an air inlet 19, 29 through which the cool air enters the gas generator 12, 22. After being taken into the enclosure of the gas generator 12, 22, the cool air is compressed by the compressor 15, 25 which discharges it to the inlet of the combustion chamber 17, 27 in which it is mixed with fuel. The combustion that takes place in the combustion chamber 17 causes the high-speed expulsion of the burned gas toward the turbine 16, 26, which has the effect of rotationally driving 14, 24 the gas generator 12, 22 and, consequently, the compressor 16, 26. The rotation speed of the shaft 14, 24 of the gas generator 12, 22 is determined by the fuel flow rate into the combustion chamber 17, 27.

Despite the extraction of kinetic energy by the turbine 16, 26, the stream of gas exiting the gas generator has significant kinetic energy. As will be understood with the help of FIG. 1, the stream of gas F is directed toward the free power turbine 11, 21 which has the effect of causing an expansion in the free power turbine 11, 21 leading to the rotation of the turbine wheel and of the shaft 13, 23.

The main rotor 62 is coupled, via the transmission members 60, to the shaft 13 of the free power turbine 11 of the first gas turbine 10 by way of a first main coupling means 51. The main rotor 62 is also coupled, via the transmission members 60, to the shaft 23 of the free power turbine 21 of the second gas turbine 20 by way of a second main coupling means 52.

Preferably, the first and the second main coupling means 51, 52 comprise a free wheel mounted so that the rotation of the shaft 13, 23 can rotationally drive the main rotor 62, but so that contrariwise, the rotation of the main rotor 62 cannot rotationally drive the shaft 13, 23 of the free power turbine 11, 21. In other words, the free wheel of the first and of the second main coupling means 51, 52 can only transfer a rotational torque in the direction from the free power turbine 11, 21 toward the main rotor 62, but not the other way round. On a helicopter, this free wheel is currently known as the "engine free wheel". Note that the use of a free wheel for the main coupling means 51, 52 and the deactivatable coupling means described below is non-limiting, since the free wheel can be replaced by any dog or clutch system.

The propulsive assembly 100 further includes a first reversible electric machine 30, mechanically coupled to the shaft 14 of the gas generator 12 by way of a first deactivatable coupling means 31.

Preferably, the first deactivatable coupling means 31 comprises a free wheel mounted so that the rotation of the first reversible electric machine 30 can rotationally drive the shaft 14 of the gas generator 12 when the first electric machine operates in electric motor mode (first coupling means 31 activated), but that on the contrary, the rotation of the shaft 14 of the gas generator 12 cannot drive the first reversible electric machine 30, if the first deactivatable coupling means 31 is not locked. In other words, the free wheel of the first deactivatable coupling means 31 can only transfer a rotational torque in the direction from the first electric machine 30 toward the gas generator 12, but not the other way round, in order to combine the high reliability of the free wheel with critical functions such as the restarting of the turbine in flight.

The first electric machine 30 is also able to be coupled to the main rotor 62, by way of a second deactivatable coupling means 32 similar to the first deactivatable coupling means 31 and preferably comprising a free wheel, in such a way that the first electric machine 30, operating in electric motor mode (second coupling means 32 activated), is able to rotationally drive the main rotor 62.

The propulsive assembly 100 also includes a second reversible electric machine 40, mechanically coupled to the shaft 24 of the gas generator 22 by way of a first deactivatable coupling means 41.

Preferably, the first deactivatable coupling means 41 comprises a free wheel mounted so that the rotation of the second reversible electric machine 40 can rotationally drive the shaft 24 of the gas generator 22 when the second electric machine is operating in electric motor mode (first coupling means 41 activated), but so that contrariwise, the rotation of the shaft 24 of the gas generator 22 cannot drive the second reversible electric machine 40, if the first deactivatable coupling means 41 is not locked. In other words, the free wheel of the first deactivatable coupling means 41 can only transfer a rotational torque in the direction from the second electric machine 40 toward the gas generator 22, but not the other way round.

The second electric machine 40 is also able to be coupled to the main rotor 62, by way of a second deactivatable coupling means 42 similar to the first deactivatable coupling means 41 and preferably comprising a free wheel, in such a way that the second electric machine 40, operating in electric motor mode (second coupling means 42 activated), is able to rotationally drive the main rotor 62.

In accordance with the propulsive assembly 100 of this summary, the first and the second electric machine 30, 40 are able to rotate in a first direction of rotation in which they are respectively mechanically coupled to the shaft 14, 24 of the gas generator 12, 22, and in a second direction of rotation, opposite to the first direction of rotation, in which they are respectively mechanically coupled to the main rotor 62. By convention, in the remainder of the description a positive direction will be understood as a direction of rotation of the first and of the second electric machine 30, 40 in which the first deactivatable coupling means 31, 41 is activated, and a negative direction will be understood as a direction of rotation of the first and of the second electric machine 30, 40 in which the second coupling means 32, 42 is activated.

In particular, the element represented by "−1" on FIG. 2 and the following figures represents gears, for example pinions, allowing the reversal of the direction of rotation. It will thus be understood that when the first and the second electric machine 30, 40 rotate in the positive direction, the first deactivatable coupling means 31, 41 is activated, and the second coupling means 32, 42 is deactivated, and when the first and the second electric machine 30, 40 rotate in the negative direction, the first deactivatable coupling means 31, 41 is deactivated, and the second coupling means 32, 42 is activated.

The first and the second reversible electric machine 30, 40 are composed in this case of an electric motor able to operate reversibly as an electric generator. To do this, one or the other of the first deactivatable coupling means 31, 41 or of the second deactivatable coupling means 32, 42 can be locked, by way of a locking means, in such a way as to be able to be rotationally driven by the main rotor 62 or by the gas generator 12, 22, and thus to generate electrical energy. This electrical energy generated by the electric machines 30, 40 can then be transferred to a "battery pack" (not shown) or can be exchanged between the electric machines 30, 40 to produce internal hybridization.

Note that although the first and the second reversible electric machine 30, 40 can be disposed in the first turbomachine, this disposition is non-limiting. The reversible electric machines 30, 40 can specifically be disposed in separate perimeters of the helicopter from the turbomachines 1, 2, without departing from the scope of the invention. This remark is applicable in general to the entire propulsive assembly also comprising the third electric machine and the different coupling means described in the remainder of the description.

A third reversible electric machine 50 can be mechanically coupled to the shaft 13, 23 of the free power turbine 11, 21 by way of the first and of the second main coupling means 51, 52.

The first and the second main coupling means 51, 52 comprising a free wheel can also be mounted so that the rotation of the shaft 13, 23 can rotationally drive the third electric machine 50 when the latter is operating in generator mode in order to supply electricity, but so that on the other hand, the rotation of the third electric machine 50 cannot rotationally drive the shaft 13, 23 of the free power turbine 11, 21. The third electric machine 50 can also operate in electric motor mode in such a way as to rotationally drive the main rotor 62 for assistance in take-off and transients for example.

Note however that although most of the figures show a propulsive assembly comprising a third electric machine 50, it is also possible to dispense with the use of the latter, without departing from the scope of the invention. Specifically, even though the third electric machine 50 makes it possible to increase the level of redundancy, the sole presence of the first and the second electric machine 30, 40 according to this architecture makes it possible to fulfil a large number of functions. In particular, in the case of operation in SEO mode described hereinafter with reference to FIG. 16, the absence of the third electric machine 50 can be compensated for by the presence of a first coupling means 81 in the first turbomachine 1, and of a second coupling means 82 in the second turbomachine 2.

The first and the second coupling means 81, 82 are referred to in the remainder of the description as clutches, but other types of coupling means can be used, such as dogs. The clutches 81, 82 are movable between a coupling position in which the main rotor 62 is coupled with the gas generator 12, 22 of the first and of the second gas turbine 10, 20 respectively, and a decoupling position in which these elements are not coupled.

In the decoupling position, the main rotor 62 cannot drive the gas generator 12, 22. In the coupling position, the main rotor 62 and the gas generator 12, 22 are mechanically linked, so that said gas generator 12, 22 can be driven, even at low speed, by the main rotor 62. This will in particular make it possible to drive the gas generator 12, 22 in its ignition window without monopolizing or stressing the electric machine 30, 40. Note that in the remainder of the description, the coupling position of the clutches 81, 82, and the locking position of the first reversible coupling means 31, 41 and of the second reversible coupling means 32, 42, are symbolized on the figures by a cross over these elements.

Moreover, the device can also comprise a rotor brake 70 disposed between the third electric machine 50 and the main rotor 62. The rotor brake 70 is movable between a braking position (represented by a cross on FIG. 4 for example), preventing the rotation of the main rotor 62 and of the power turbine 11 and/or 21, and a free position allowing the rotation of the main rotor 62 and of the free power turbine 11 and/or 21. Note however that although the FIGS. 1 to 18 show a device comprising such a rotor brake 70, it is possible to dispense with the use of the latter, without departing from the scope of the invention. Indeed, the rotor brake function can also be fulfilled by the first and the second electric machine 30, 40 operating in generator mode so as to create a torque opposing the rotation of the main rotor 62, making it possible to brake, or even to lock the latter. In this case, the rotor brake 70 can be under dimensioned or absent, or else replaced by a locking system of clutch or dog type.

Given this architecture, different functions can be fulfilled by the propulsive assembly. These different functions are described below with reference to FIGS. 3 to 18. On these figures, the arrows in broken lines represent a direction of transmission of mechanical or electrical power between two elements. On FIG. 3 for example, a mechanical power is transmitted from the first electric machine 30 to the shaft 14 of the gas generator 12 of the first gas turbine 10. Note moreover that in general, for the sake of clarity, FIGS. 2 to 18 schematically and functionally and in a simplified manner represent the different modes of operation of the device, without representing all the details of the elements constituting the turbomachine and the different power transmission members. In particular, the pinions and any gear ratios are not shown.

FIG. 3 shows an operating mode allowing the starting of the first turbomachine 1, in particular of the first gas turbine 10. The first electric machine 30 is driven, for example by a control unit (not shown) in such a way as to rotate in the positive direction. Thus, it drives the gas generator 12 by way of the free wheel of the first coupling means 31, allowing the starting of the gas generator 12.

At start-up, the hot gas drives the free power turbine 11. The latter, connected to the main rotor 62 via the free wheel of the first main coupling means 51, can be either free, when the rotor brake 60 is in the free position (FIG. 3), or locked by the rotor brake when the latter is in the brake position (FIG. 4). The latter configuration can be useful if starting in strong winds, Furthermore, since the power of the first electric machine 30 is in the order of several tens to a few hundred kilowatts, it is possible to start the turbine much more quickly than with a starter of a power in the order of 10 kW, usually used. This in particular provides an operational advantage in the event of missions of medical emergency type, or during quick restart attempts in flight (described hereinafter and illustrated in particular on FIG. 13).

In the scenario where the rotor brake 60 is in the braking position, the first electric machine 30 can then operate in generator mode, the "generator" mode being represented by a small flash on FIG. 4 and the following figures. FIG. 4 shows this operation used to generate electricity on the ground. More precisely, this operating mode, the so-called APU (Auxiliary Power Unit) mode, is an operating mode in which the first gas turbine 10 drives an electric generator without driving the main rotor of the helicopter, to make it possible to supply power to electric devices on the ground, such as batteries, flight equipment, heating or climate control. In particular, this mode makes it possible to recharge the batteries which can be used in flight to supply the electric machines to provide the electrical assistance to the main rotor 62 from the take-off phase onwards for example.

To fulfil this function, a locking means (not shown) is actuated to lock the first reversible coupling means 31, so that the gas generator 12 of the first gas turbine 10 can drive the first electric machine 30. The first electric machine 30 thus draws off power to return it to the electrical equipment, while the free power turbine 11 is locked by the rotor bake 70, then in the braking position.

Note that the starting of the second turbomachine 2 is done following the same diagram as the first turbomachine 1, and the second electric machine 40 can also operate in generator mode in "APU" mode, in the same way as the first electric machine, by locking the first reversible coupling means 41.

FIG. 5 shows a nominal operation with electrical power generation on the ground ("APU" mode, rotary turbine) or in flight. After the starting of the first gas turbine 10, the first free power turbine 11 drives the main rotor 62 by way of the main coupling means 51. The first free power turbine 11 also drives the third electric machine 50 then operating in generator mode, along with the first electric machine 30 also operating in generator mode, the second reversible coupling means 32 being locked.

FIG. 6 shows an alternative example in which the two gas turbines 10, 20 are ignited and are driving the main rotor 62 and the first and the second electric machine 30, 40 are operating in generator mode, the second coupling means 32, 42 being respectively locked. This operating mode can be used on the ground or in flight, and in particular makes it possible to limit the draws on the gas generators and thus limit the impact on performance. This very high simultaneous power generation also allows the recharging of a high-power battery for example.

FIG. 7 shows a nominal operation allowing a contribution of power to the main rotor 62 by the third electric machine 50 and FIG. 8 shows a nominal operation allowing a contribution of power to the main rotor 62 by the first and the second electric machine 30, 40, each operating in electric motor mode, and then rotating in the negative direction. This configuration can be useful in certain flight phases requiring an additional power contribution, for example at take-off. The first electric machine 30 and the second electric machine 40 thus make it possible to complete the power input to the main rotor 62 by the free power turbines 11, 21. Note that this power contribution to the main rotor 62 is intermittent, and potentially recurrent, and does not require any active system such as a dog or a clutch. Thus, free wheels have an advantage in terms of reliability.

FIG. 9 shows a nominal operation with power contribution on the shafts 14, 24 of the gas generators to improve responsiveness during transient phases. In certain flight phases, for example when there are considerable torque requirements, the speed of rotation of the free power turbines can abruptly drop and require a high degree of responsiveness from the gas generator 12, 22. In this case, the first and/or the second electric machine 30, 40 can, by rotating in the positive direction, input to the acceleration of the speed of the gas generator 12, 22 to deliver the required power as soon as possible. The power can come from a battery pack (not shown), but also from the third electric machine 50, as illustrated on FIG. 9. The third electric machine 50 then operates in generator mode, and is electrically connected to the first and to the second electric machine 30, 40 via an electrical connection 90.

FIG. 10 shows a twin-engine nominal operation with internal hybridization and transfer of power from the gas generator to the main rotor. In certain twin-engine flight phases, it can be useful to produce the internal hybridization, i.e. transfers of power between the main rotor and the gas generators, or conversely. On FIG. 10, the first coupling means 31, 41 are locked. The first and the second electric machine 30, 40 then operate in generator mode, and transfer electrical energy to the third electric machine 50 by way of an electrical connection 90, the third electric machine itself operating in motor mode to drive the main rotor 62.

FIGS. 11 and 12 show other examples of operation with internal hybridization. On a twin-engine assembly, it can happen that the first turbomachine 1 (for example) reaches its cyclical fatigue more quickly than the second turbomachine 2. It is then possible, in the absence in particular of a third electric machine, to provide an asymmetrical internal hybridization, using the second electric machine 40 to generate electrical power through the first or the second reversible coupling means 41, 42, in such a way as to assist the first gas turbine 10.

Thus, on FIG. 11, the second electric machine 40 operates in generator mode by drawing power off the shaft 24 of the gas generator 22, the first reversible coupling means 41 being locked. On FIG. 12, the second electric machine 40 operates in generator mode by drawing power off the main rotor 62, the second reversible coupling means 42 being locked. In both configurations, the power is transferred from the second electric machine 40 to the first electric machine 30 (which operates in motor mode by rotating in a positive direction) via an electrical connection 90.

FIG. 13 shows an operation in the event of an untimely flame-out of one of the turbomachines in flight. In the event of flame-out of the second turbomachine 2, according to the example of FIG. 13, the first turbomachine 1 supplies the entirety of the power to the main rotor 62. The second electric machine 40 then rotates in the positive direction to drive, via the first reversible coupling means 41, the gas generator 22 of the second gas turbine 20, to attempt to restart it. The power of the second electric machine 40 being in the order of a few tens to a few hundreds of kilowatts, it is possible to restart the gas generator 22 much more quickly than with a starter of a power in the order of 10 kW, habitually used. Moreover, the first and/or the third electric machine 30, 50 (the first electric machine 30 then rotating in the negative direction in motor mode) can be used to supplement the power to the main rotor 62, thus avoiding or delaying the use of the emergency ratings of the second turbomachine 2.

If the restart attempt fails, or if it is not possible, the flight may continue on a single turbine (in this example, on the first gas turbine 10), with the first and/or the second and/or the third electric machine 30, 40, 50 used in motor mode to supply a power contribution to the main rotor 62 in the operating phases that require it (for example clearing a dangerous area or landing), within the use limits of the batteries. This configuration is shown on FIG. 14.

FIGS. 15 and 16 show an operation in SEO (for "Single Engine Operative") mode, in which only the first turbomachine 1 is in operation, providing the entire power to the main rotor 62, the second turbomachine 2 being deliberately stopped. When the SEO mode is engaged, the second gas turbine 20 is put into standby (or into assisted super-idle), i.e. it no longer supplies any power. On the other hand, to be started as quickly as possible, its gas generator 22 is driven in the ignition window (in a range of 5 to 30% of its nominal rotation speed) by the second electric machine 40 via the first reversible coupling means 41.

In the example shown on FIG. 15, a third electric machine 50 is used in generator mode to supply, via the electric connection 90, the second electric machine 40 which keeps the second gas turbine 20 in standby, and also the first electric machine 30 to produce the internal hybridization and limit the ageing of the first gas turbine 10. Note that the third electric machine 50 can also be used in motor mode to supplement the power supplied by the first gas turbine 10 to the main rotor 62, in certain operational phases requiring it.

In the example shown in FIG. 16, clutches 81, 82 are used instead of the third electric machine 50. More precisely, the second clutch 82 is placed in a coupling position in such a way as to couple the main rotor 62 with the gas generator 22 of the second gas turbine 20, in order to keep the second gas turbine 20 in standby, without using the second electric machine 40. In this configuration, the second electric machine 40 is then used in generator mode, while locking the second reversible coupling means 42, in such a way as to produce the internal hybridization (via the electrical connection 90) between the second electric machine 40 and the first gas turbine, while keeping the second gas turbine 20 in standby.

When exit from SEO mode is desired, the second gas turbine 20 is restarted with the same sequence as for a conventional start, described above with reference to FIG. 3. However, in the event of loss of power of the first gas turbine 10, a quick restart of the turbine gas 20 can be necessary. To do this, the second electric machine 40 supplies a high power (in the order of 50 kW) to the gas generator 22 of the second gas turbine 20. At the end of the sequence, the second gas turbine 20 provides the entire power, optionally at an emergency rating.

Advantageously, between the loss of power of the first gas turbine 10 and the provision of the power of the second gas turbine 20 by re-ignition of the latter, the third (when the latter is used) and/or the first (rotating in the negative direction) electric machines 50, 30 can be put to contribution to supply power to the main rotor 62 and limit the drop in speed thereof. This mode of operation of quick restarting of the second gas turbine 20 with the assistance of the first and of the third electric machine 30, 50 is shown on FIG. 17.

After reignition of the second gas turbine 20, the first and/or the second and/or the third electric machine 30, 40, 50 can be used in motor mode to supply the main rotor 62 and thus relieve the second gas turbine 20 operating alone. This configuration is shown on FIG. 18. Alternatively, they can be used in generator mode, if the second gas turbine 20 is able to supply the necessary power to recharge the battery pack and provide for a potential later use.

Note that it is also possible to use decoupling means such as weak links, in order to limit risk in the event of component failures. In particular, a weak link can be installed on the drives of the first, second and third electric machines 30, 40, 50 in order to protect the members from a failure of the electric machines. It is also possible to add a weak link on the shafts of the first and second electric machines 30, 40 to guard against any overtorque of the electric machine, and protect the pinions and free wheels. Such weak links could similarly prevent a possible locking of the gas generator 10, 20 of the turbine in standby mode and driven by the clutches 81, 82.

Although this invention has been described with reference to specific exemplary embodiments, it is obvious that changes can be made to these examples without departing from the general scope of the invention as defined by the claims. In particular, individual features of the different embodiments illustrated/mentioned may be combined into additional embodiments. Consequently, the description and the drawings must be considered in an illustrative sense rather than a restrictive one.

The invention claimed is:

1. A propulsive assembly for a hybrid aircraft, particularly a multi-engine helicopter, comprising:
    at least a first gas turbine and a second gas turbine each having a gas generator and a free power turbine rotationally driven by a stream of gas generated by the gas generator,
    a main rotor coupled to the free power turbine of the first gas turbine and of the second gas turbine by way of a first and a second main coupling means respectively,
    a first reversible electric machine and a second reversible electric machine each coupled to the gas generator of the first gas turbine and of the second gas turbine respectively, by way of a first deactivatable coupling means, and each coupled to the main rotor by way of a second deactivatable coupling means, the first deactivatable coupling means being each configured to be activated when the first and the second electric machine are rotating in a first direction of rotation, and the second deactivatable coupling means being configured to be activated when the first and the second electric machine are rotating in a second direction of rotation opposite to the first direction of rotation.

2. The propulsive assembly as claimed in claim 1, wherein the first electric machine and the second electric machine are configured to operate in motor mode in which they are able to input power to the main rotor or to the gas generator of the first and of the second gas turbine respectively, according to their direction of rotation, or in generator mode in which they are able to be rotationally driven by the main rotor or by said gas generator by locking one or the other of the first or the second deactivatable coupling means, in such a way as to generate electrical energy.

3. The propulsive assembly as claimed in claim 1, comprising a first coupling means coupled to the main rotor and to the gas generator of the first gas turbine, and a second coupling means coupled to the main rotor and to the gas generator of the second gas turbine, the first and the second coupling means being movable between a decoupling position, and a coupling position in which the main rotor is coupled with the gas generator of the first and of the second gas turbine respectively.

4. The propulsive assembly as claimed in claim 3, wherein, when one of the first or the second gas turbine is the only one driving the main rotor, the gas generator of the other of the first or the second gas turbine is kept in a standby mode, at a power of less than 5 kW, by way of the first or the second coupling means in the coupling position.

5. The propulsive assembly as claimed in claim 2, wherein, when the first gas turbine is the only one driving the main rotor, the first electric machine operates in motor mode in such a way as to input power to the gas generator of the first gas turbine, and the second electric machine operates in generator mode in such a way as to input electrical energy to the first electric machine.

6. The propulsive assembly as claimed in claim 2, configured so that, when the first gas turbine that is the only one driving the main rotor stops, the second electric machine operates in motor mode in such a way as to input a power greater than or equal to 50 KW to the gas generator of the second gas turbine.

7. The propulsive assembly as claimed in claim 1, comprising a third reversible electric machine able to be coupled to the main rotor and to the free power turbine of the first gas turbine and of the second gas turbine by way of the first main coupling means and the second main coupling means respectively.

8. The propulsive assembly as claimed in claim 7, wherein the third electric machine is configured to operate in generator mode, in which it is able to be rotationally driven by the main rotor, itself driven by the free power turbine of the first and/or of the second gas turbine by way of the first and/or the second main coupling means, in such a way as to generate electrical energy, or in motor mode in which it is able to input power to the main rotor.

9. The propulsive assembly as claimed in claim 8 wherein, when the first gas turbine is the only one driving the main rotor, the gas generator of the second gas turbine is kept in standby mode, at a power of less than 5 kW, by way of the second electric machine which operates in motor mode, the first electric machine operating in motor mode in such a way as to input power to the gas generator of the first gas turbine, and the third electric machine operates in generator mode in such a way as to input electrical energy to the first and to the second electric machine.

10. The propulsive assembly as claimed in claim 1, wherein the first and the second main coupling means, and the first and the second deactivatable coupling means associated with each of the first and the second electric machine, comprise a free wheel.

11. A hybrid aircraft comprising a propulsive assembly as claimed in claim 1, the hybrid aircraft being a multi-engine helicopter, particularly a twin-engine helicopter.

* * * * *